United States Patent Office 3,185,656
Patented May 25, 1965

3,185,656
PREPARATION OF LINEAR POLYUREAS UTILIZING A CYCLIC AMIDE SOLVENT
Rudolf Gabler, Zollikerberg, Zurich, and Helmut Müller, Oberrieden, Zurich, Switzerland, assignors to W. R. Grace & Co., Cambridge, Mass., a corporation of Connecticut
No Drawing. Filed Mar. 23, 1961, Ser. No. 97,739
Claims priority, application Switzerland, Mar. 29, 1960, 3,510/60
8 Claims. (Cl. 260—30.2)

The present invention relates to the production of linear, fiber-forming polyureas from urea and diamines, wherein the polycondensation is carried out at elevated temperatures in the presence of cyclic amines and lactams having less than seven ring members.

Although the polyureas have been known for some time, they have not obtained any significant practical importance until now, unlike, for example, the chemically related polyamides. The reason for this lies less with the characteristics of the polymers, which are, in many respects, very interesting, than with the technical difficulties of the production and preparation of this class of synthetic resins.

One of the simplest and first known processes for the production of polyureas consists in the condensation of urea with aliphatic diamines in a fusion mixture at a temperature at which the two molecules of ammonia are split off. As long as temperature conditions are mild, i.e., under 200° C., the principal products of the reaction are linear, unbranched and non-crosslinked polymers. The molecular weights of these products are, however, not sufficiently high, and their mechanical characteristics are therefore unsatisfactory.

Raising the condensation temperatures above 200° C. results in an increase of the molecular weight to any desired degree. However, side reactions occur simultaneously, apparently through formation of biuret and guanidine groups, resulting in branching and crosslinking reactions. Even when such reactions occur only to a small extent, they can seriously interfere with subsequent working processes such as spinning and stretching of threads.

It has been suggested that the polycondensation be carried out in a solution of a phenol or cresol, preferably in m-cresol, which results in complete suppression of at least considerable reduction of the side reactions. Phenolic solvents have the disadvantage, however, of being very difficult to separate from the polymer. Traces of only 0.01 to 0.1 percent of phenol or cresol remaining in the polymer, can result in a yellowing of the granulate upon drying and a lowered strength of the final product.

It has now been found that the above disadvantages of the phenolic solvent method can be avoided if the polycondensation is carried out in a solution of a cyclic amide (lactam) having a ring containing less than seven ring members. The lactams are ideal solvents for this special purpose since at boiling point they dissolve both monomers and polymers to an unlimited degree, while the polyureas are insoluble in cold lactams (at room temperature). This eliminates the necessity of precipitating the polymers with a second solvent, a step which is unavoidable when using phenolic solvents. Furthermore, most of the lactam can be recovered undiluted by filtering, pressing or centrifuging.

The lactams have a further advantage when used according to this invention in that they are neither predilected towards oxidative discoloration nor do they influence the strength of the polyurea produced, as is the case with the phenols. For this reason, the necessity to completely remove the solvent is eliminated for most purposes of use of the polyureas.

In addition to the lactams, other alkylated representatives, such as the N-alkyl or C-alkyl lactams can also be used. Among these are, for example, N-methyl pyrrolidone, N-ethyl pyrrolidone, N-isopropyl pyrrolidone, 3-methyl piperidone, 3-methyl pyrrolidone, 5-methyl pyrrolidone, etc. The use of N-alkylated lactams is especially advantageous since they have lower boiling points than the unsubstituted lactams. Thus, for example, most polyureas can be condensed in N-methyl pyrrolidone at its boiling point of 202° C., which makes the maintenance of a constant temperature very simple.

A further difference between the N-alkylated lactams and those cyclic amides which are either not substituted or are substituted only on the carbon atoms, is that the viscosity of solutions of polyureas of the same concentration have a decidedly lower viscosity in the former than in the latter group of compounds. This characteristic makes it possible to carry out polycondensation at considerably higher concentration in the N-alkylated lactams.

Generally in accordance with the described process, 30 to 50 percent solutions, calculated on the amount of polyurea which condenses out, are used. The concentrations can be increased to 80 to 90 percent, whereby the solution becomes highly viscous and can be discharged from the reaction vessel as a continuous cohesive strand which, after cooling with water, can be continuously granulated. A further modification of the process of this invention consists in initiating the polycondensation with a 30 to 50 percent solution and by subsequent continuous or step-wise distillation of the solvent, increasing the concentration of the polymer to 80 to 90 percent. If desired, the solvent can be completely removed shortly before the polycondensation is complete.

The polycondensation process of the present invention can be used without limitation on all polyurea-forming combinations consisting of urea and any desired diamine. Diamines which are suitable are primarily linear aliphatic diamines such as the hexa, hepta, octa, nona and decaethylene diamine, B-B'-diamino dipropyl ether, and the cycloaliphatic diamines such as 1,4-diamino cyclohexane, 1,4-diamino methyl cyclohexane, and 4,4'-diamino dicyclohexyl methane.

Urea and the diamine are generally mixed in the stoichiometric ratio. The reagents can also be used in excess, thus influencing, within certain limits, the molecular weight of the polyurea. The same effect can be achieved by addition of small quantities of acids, bases or salts. Plasticizers, dyes, and fillers of all types, as well as stabilizers against the deleterious action of light and heat can also be added to the polymerization reagents.

The following examples illustrate but do not limit the process of the present invention.

*Example 1*

130 parts of heptamethylene diamine and 60 parts of urea are dissolved in 400 parts of pyrrolidone under nitrogen with strong heating in a 7-neck round-bottomed flask fitted with gas intake and exhaust tubes and a reflux condenser. At 130 to 150° C. a strong evolution of ammonia is initiated. The mixture is maintained at this temperature for a half hour and then heated to 220° C. After 2 hours the temperature is raised to 240° C. and held there for 4 to 6 hours. The hot solution is stirred into 4,000 parts of acetone or methanol, the resulting coarsely flocculent polymers filtered, freed from solvent by washing with hot water, and dried. The pure-white poly(heptamethylene urea) has a melting point at 235 to 240° C. and a relative viscosity of 1.70 measured in concentrated sulphuric acid (c.=1 g./100 ml.).

Example 2

158 parts of nonamethylene diamine and 60 parts of urea in 200 parts of N-methyl pyrrolidone are heated to 130 to 150° C. under nitrogen at normal pressure in a polymerization autoclave, whereby a strong ammonia evolution sets in. The temperature is raised from 150° C. to 220° C. during the course of an hour, at which temperature the solvent begins to distill off. After the temperature has been raised to 260° C. during the course of another hour, and held there for a further 4 hours, the highly viscous melt is pressed through a nozzle by 5 to 6 atmospheres' nitrogen pressure. The resulting ribbon is immediately cooled by immersion in water at room temperature and granulated.

The poly(nonamethyl urea) which is obtained is clear, transparent, and usually somewhat yellowish. Its melting point is 215 to 220° C., and the relative viscosity of a 1 percent solution in concentrated sulphuric acid is 1.65. It can be spun into elastic threads or worked into foils, molds, etc. in the usual manner.

Example 3

142 parts of 1,4-aminomethyl cyclohexane (primarily cis isomers) and 60 parts of urea plus 600 parts of N-ethyl pyrrolidone are heated with the exclusion of oxygen, to 150° C. in a polymerization vessel equipped with a reflux condenser and gas inlet and exhaust tubes. A strong evolution of ammonia starts. Upon cessation of the gas production, the temperature is raised to 220° C. and held there for 4 to 6 hours, after which the mix is allowed to cool. Upon cooling, the polymer precipitates out quantitatively as a pure, white powder which is then freed from adhering solvent by means of a filter press. The last traces of solvent can be removed by treatment with hot water or superheated steam.

The resulting polyurea melts at 240 to 245° C. and can be worked into threads, foils, ribbons or molds in the usual manner. Its relative viscosity of a 1 percent solution in concentrated sulphuric acid is 1.75.

Example 4

132 parts of diamino-propylether, 60 parts of urea and 3 parts of sebacic acid in 400 parts N-methyl pyrrolidone are heated to 130 to 150° C. in a round-bottomed flask equipped with a reflux condenser and gas intake and exhaust tubes, until a strong evolution of ammonia sets in. Upon cessation of gas production, the temperature is raised to 220° C. where it is held for 2 hours. The temperature is raised to 240° C. and maintained for 4 to 6 hours. While still hot, the viscous solution is poured into 4,000 parts of acetone at room temperature. The polymer precipitates out as a coarse flocculate, is filtered, comminuted mechanically, washed with hot water to remove the remainder of the solvent, and dried.

The pure white polymer melts at 195 to 197° C. and can be worked into threads, foils, ribbons, etc., in the usual manner. The relative viscosity of a 1 percent solution in concentrated sulphuric acid is 1.72.

We claim:

1. The process for the production of a linear, fiber-forming polyurea by the condensation of urea and a diamine selected from the group consisting of a linear aliphatic diamine and a cycloaliphatic diamine which comprises dissolving the reactants in a solvent, heating the resulting solution at an elevated temperature below 200° C. until the evolution of ammonia ceases, and subsequently continuing heating at a temperature from above 200° C. up to about 260° C., said solvent being a cyclic amide having the structure

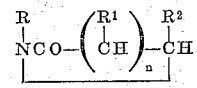

where R, R¹ and R² represent substituents selected from the group consisting of hydrogen and a lower alkyl radical having 1 to 3 carbon atoms and $n$ has one of the values 2 and 3.

2. A process according to claim 1 wherein the solvent is N-isopropyl pyrrolidone.
3. A process according to claim 1 wherein the solvent is 3-methyl piperidone.
4. A process according to claim 1 wherein the solvent is 3-methyl pyrrolidone.
5. A process according to claim 1 wherein the solvent is 5-methyl pyrrolidone.
6. The process according to claim 1, wherein the solvent is N-methyl pyrrolidone.
7. The process according to claim 1, wherein the solvent is N-ethyl-pyrrolidone.
8. A process according to claim 1 wherein the solvent is pyrrolidone.

References Cited by the Examiner

UNITED STATES PATENTS

| | | | |
|---|---|---|---|
| 2,145,242 | 1/39 | Arnold | 260—77.5 |
| 2,720,508 | 10/55 | Melamed | 260—77.5 |
| 2,888,438 | 5/59 | Katz | 260—77.5 |
| 2,046,254 | 7/62 | Inaba | 260—77.5 |
| 3,119,793 | 1/64 | Inaba | 260—77.5 |

FOREIGN PATENTS 52,875  6/44  France.

LEON J. BERCOVITZ, *Primary Examiner.*

H. N. BURSTEIN, DONALD E. CZAJA, *Examiners.*